Figure 1:
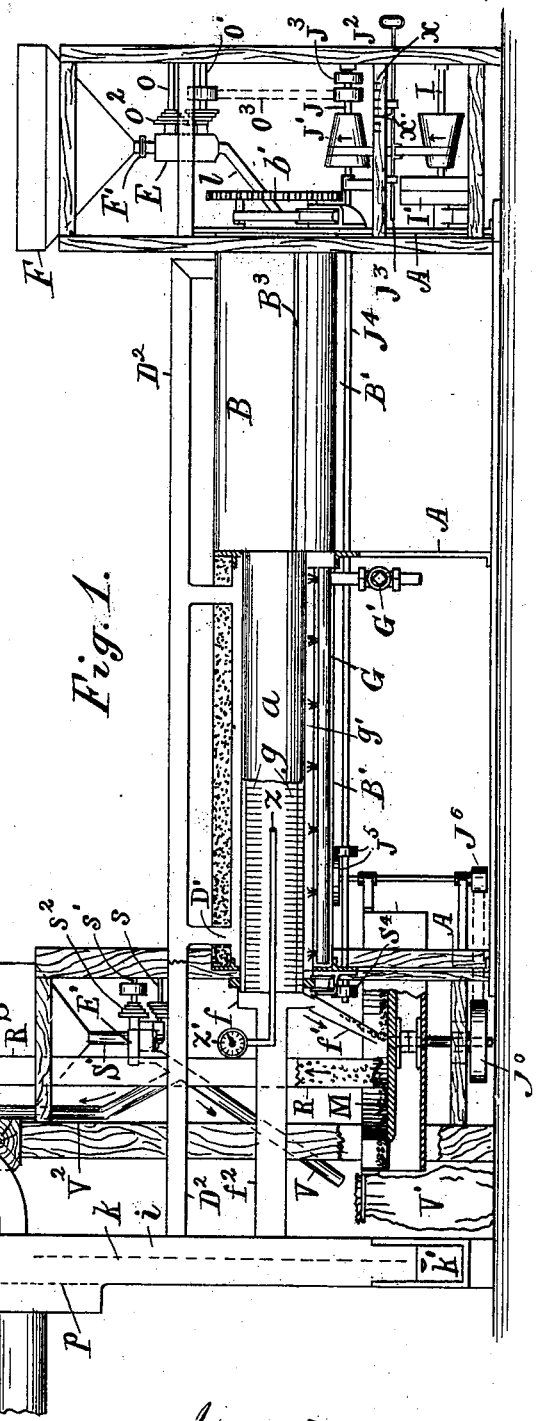

No. 703,508. Patented July 1, 1902.
T. M. WARD.
COFFEE ROASTER.
(Application filed Nov. 30, 1901.)
(No Model.) 4 Sheets—Sheet 1.

Attest:
L. Lee.
Walter H. Talmage.

Inventor.
Timothy M. Ward, per
Thomas S. Crane, Atty.

THE NORRIS PETERS CO., PHOTO-LITHO., WASHINGTON, D. C.

No. 703,508. Patented July 1, 1902.
T. M. WARD.
COFFEE ROASTER.
(Application filed Nov. 30, 1901.)
(No Model.) 4 Sheets—Sheet 2.
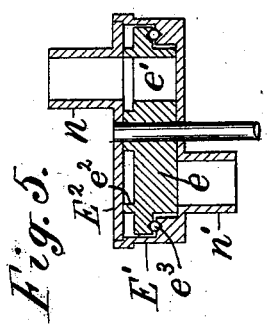
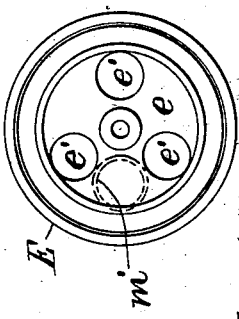
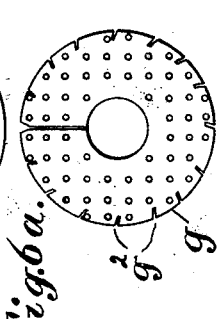
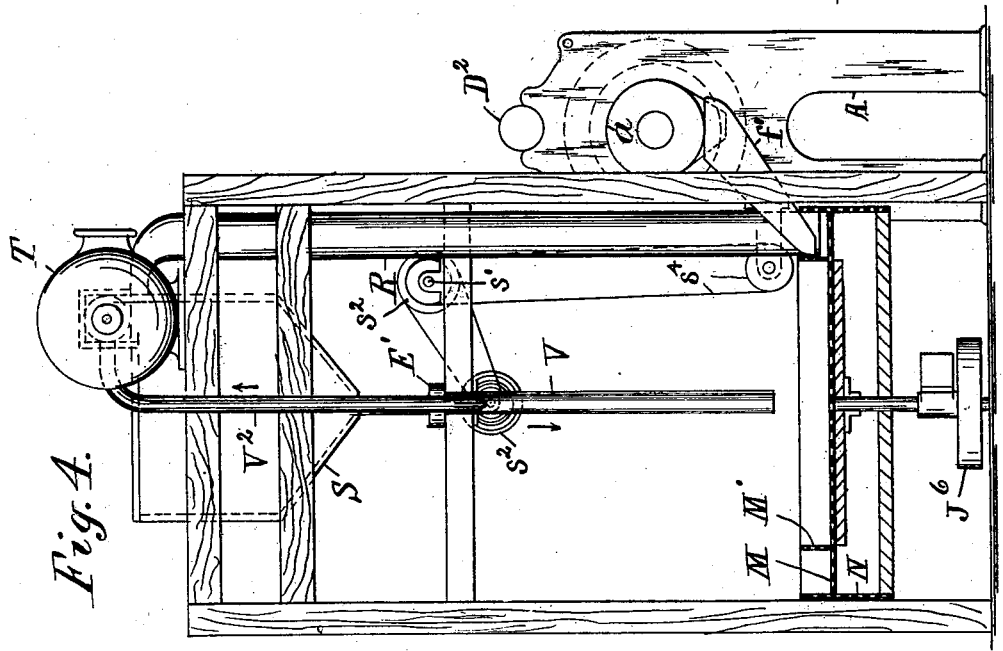
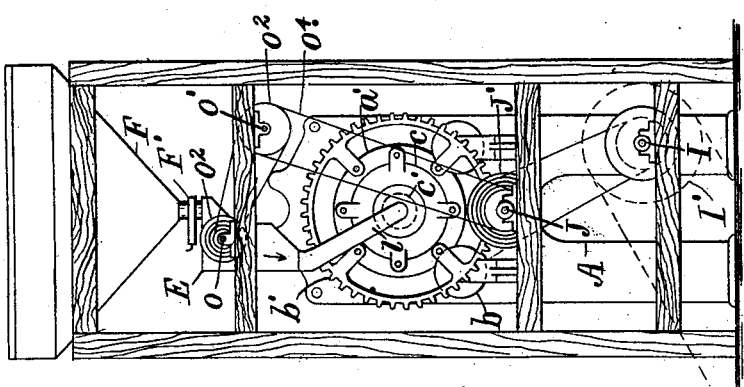
Attest:
L. Lee.
Walter H. Talmage.
Inventor.
Timothy M. Ward, per
Thomas S. Crane, Atty.

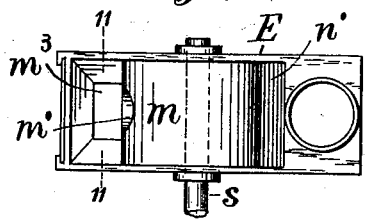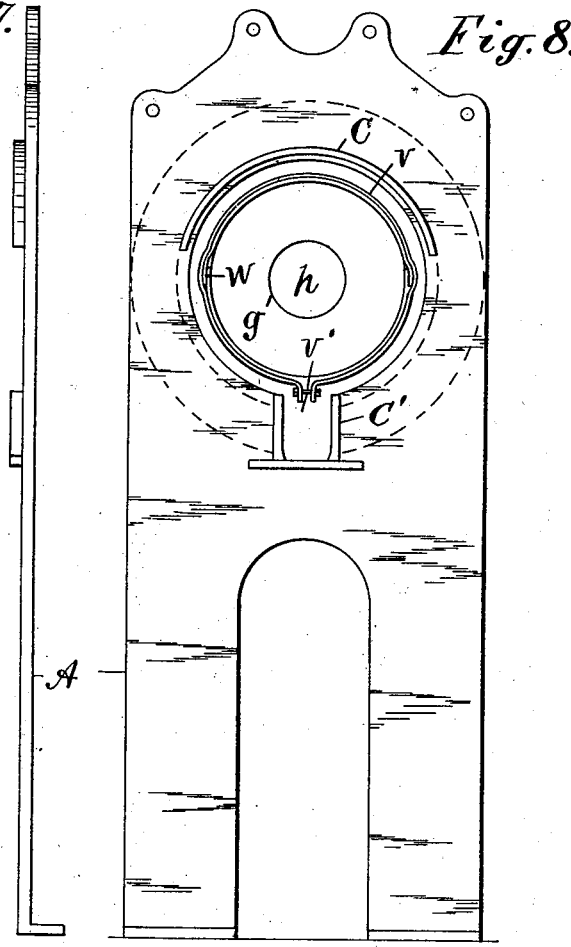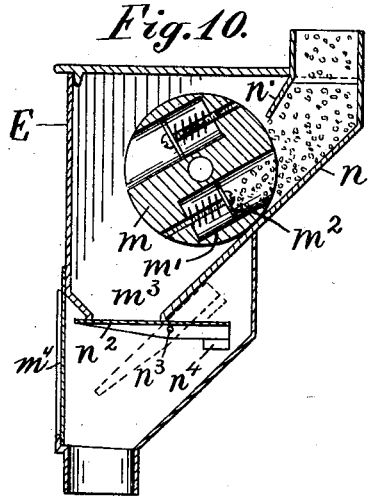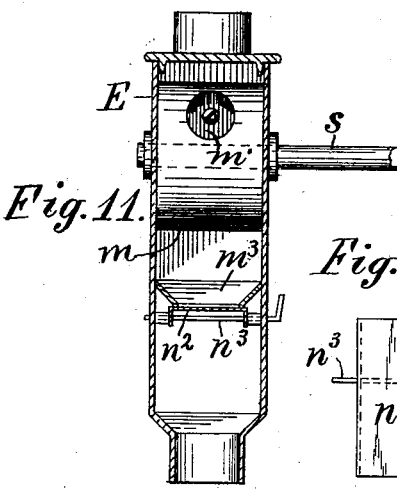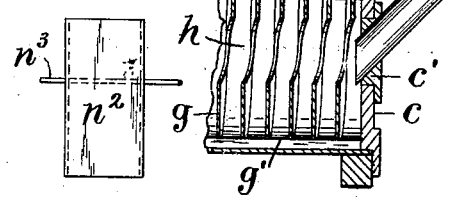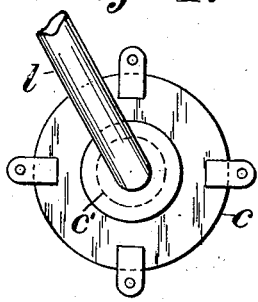

No. 703,508. Patented July 1, 1902.
T. M. WARD.
COFFEE ROASTER.
(Application filed Nov. 30, 1901.)
(No Model.) 4 Sheets—Sheet 4.
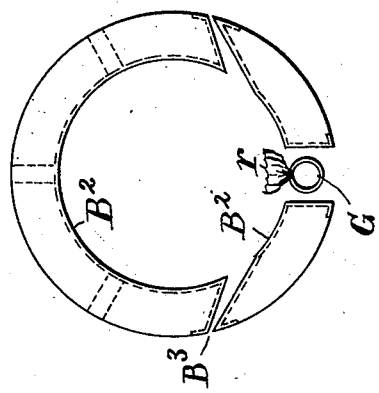
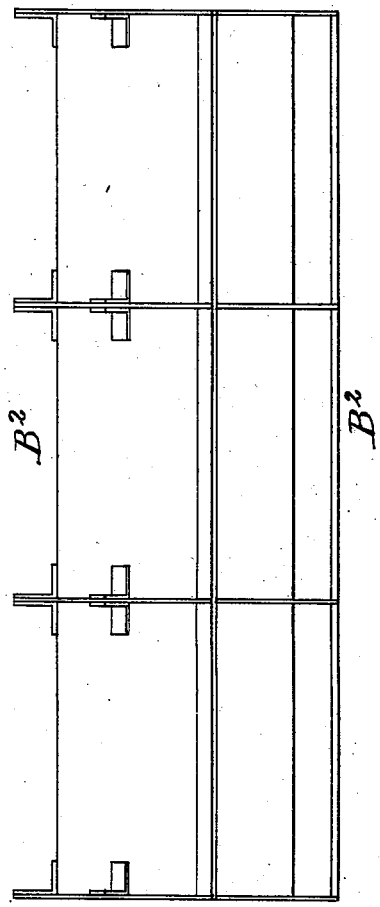

UNITED STATES PATENT OFFICE.

TIMOTHY M. WARD, OF NEWARK, NEW JERSEY.

COFFEE-ROASTER.

SPECIFICATION forming part of Letters Patent No. 703,508, dated July 1, 1902.

Application filed November 30, 1901. Serial No. 84,174. (No model.)

*To all whom it may concern:*

Be it known that I, TIMOTHY M. WARD, a citizen of the United States, residing at 13 Warren street, Newark, county of Essex, State of New Jersey, have invented certain new and useful Improvements in Continuous Coffee-Roasters, fully described and represented in the following specification and the accompanying drawings, forming a part of the same.

The object of this invention is to furnish a mechanism which will automatically handle a continuous stream of beans in an uninterrupted process or operation, in which the coffee is fed to an inclosed rotary cylinder, is moved progressively through the same, is discharged from the cylinder to the cooling-table, the roasted coffee cooled in a continuous stream, the chaff separated from the beans, and the cooled beans delivered into bags or other receptacles. Different parts of such an apparatus have been used separately in other coffee-roasting machines; but my invention differs from others in combining with the rotary roasting-cylinder a cooler having either a moving bed or means for removing the coffee continuously from the cooler and a connection from the rotary cylinder to the means for moving the bed or removing the coffee, so that the coffee roasting and cooling appliances may both work in unison and operate upon the same amount of coffee during the same period of time. It is highly important in the roasting of coffee that the roasting process should cease at the proper instant and the coffee thereafter be cooled as promptly as possible, and my invention furnishes a means of effecting the cooling in the desired manner and also of regulating the temperature of the roasting-cylinder, the feeding of the coffee thereto, the discharge of the coffee from the cylinder at the proper instant, and the removal of the coffee from the cooler at the proper rate. With such construction my roaster not only has the advantage of operating automatically, but it has a very natural advantage over any construction in which the coffee is roasted and cooled in separate charges, as it permits an absolutely uniform treatment of the coffee, and thus secures a perfectly uniform quality in the product. To cool the coffee promptly upon its discharge from the roaster, I find it is essential to discharge the coffee in a small stream and expose it immediately to the cooling influences.

My invention, therefore, includes the combination, with the roasting-cylinder, of means for continuously feeding the coffee into one end of the cylinder, means for propelling the coffee through the cylinder, means for discharging the coffee to the cooler in a continuous stream from the opposite end of the cylinder, means for removing the coffee from the cooler, and connections for conjointly operating these various agencies, so as to handle the coffee automatically throughout the entire process. Where all these factors, as well as the heat applied to the roasting-cylinder, are regulated and are adjustable, it is obvious that different portions of the coffee may be successively subjected to the same treatment and a uniform grade of product obtained.

With the mechanism I have invented it is possible to procure such a uniform operation of the heat upon the coffee; but as each of the elements requires regulation it is obvious that no mechanism in which the different agencies are operated independently of one another can produce the same results as are effected by operating upon a continuous small stream of the coffee, as in my invention.

In the present invention one head of the roasting-cylinder is provided with an inlet to supply the raw coffee continuously, and the other head is held stationary and provided with a flue-pipe and at the bottom part with a discharge-pipe, from which the roasted coffee is continuously delivered. The flue-pipe is connected with a vertical box, into one side of which the flue-pipe is inserted and from the opposite side of which the flue connection is made, and a vertical partition extends between the inlet and outlet, with a passage at the end to permit the movement of the smoke. Such partition serves to arrest the chaff which is carried from the roasting-cylinder, and the same is collected and removed from the bottom of the box. The roasting-cylinder is provided internally with spiral conveyer-blades secured inside the shell, the blades being formed with a central opening to form a continuous smoke-passage, and such blades produce a continuous spiral channel adjacent to the shell of the cylinder, through which channel the coffee is advanced by the rotation of the cylinder. Ribs are inserted between the spiral blades transverse to the movement of the coffee to agitate and lift the coffee in its progress, and the burning or overheating of the coffee is thus avoided. The coffee is fed to the cylinder from an elevated hopper by a feeding device which is designed to prevent hot air from escaping from the interior of the cylinder and to thus avoid the reduction of temperature. Such feeding device is constructed to deliver the coffee gradually to the roasting-cylinder and to cut off the passage of hot air and steam from the same during such delivery. The roasting-cylinder is surrounded by a non-conducting jacket forming a heating-chamber about the cylinder, and gas-burners are provided in the bottom of such chamber to heat the cylinder, and smoke-outlets are formed in the top of the jacket and a flue connection extended therefrom to remove the products of combustion. Any other fuel or source of heat may be used instead of gas. The supply of gas or other heating agent is adjustable to vary the heat of the cylinder, and means is provided to vary the speed of the cylinder's rotation, as well as the delivery of the feeding device. The roasting-cylinder is divisible longitudinally, so that its interior may be inspected when required, and the jacket is formed in sections, which are supported removably about the cylinder, which permits access to the cylinder and inspection of the same when required. A movable cooling-table is provided with a perforated support, upon which the hot coffee is delivered from the roasting-cylinder, and air is drawn through the perforations of the table to cool the coffee and carry off the fumes. A closed receiver for the roasted coffee is arranged above such table and provided with a screened chamber upon the top, to which an exhaust-fan is connected, and a lifter-tube is connected with the upper part of the receiver and extended to the movable table to operate as a pneumatic lifter and transfer the coffee from the channel of such table to the receiver, leaving stones and other heavy substances to be removed by hand when convenient. The coffee is drawn from the receiver through a discharge-drum, which discharges the coffee from the receiver, while cutting off the inlet of air to the receiver. Such construction maintains the desired exhaust within the receiver to operate the pneumatic lifter. To the spout through which the coffee is discharged from the receiver is attached a device by which any chaff or light beans remaining with the coffee are removed, and the coffee is allowed to pass into bags or other receptacles ready for shipment or use.

The invention will be understood by reference to the annexed drawings, in which—

Figure 2:
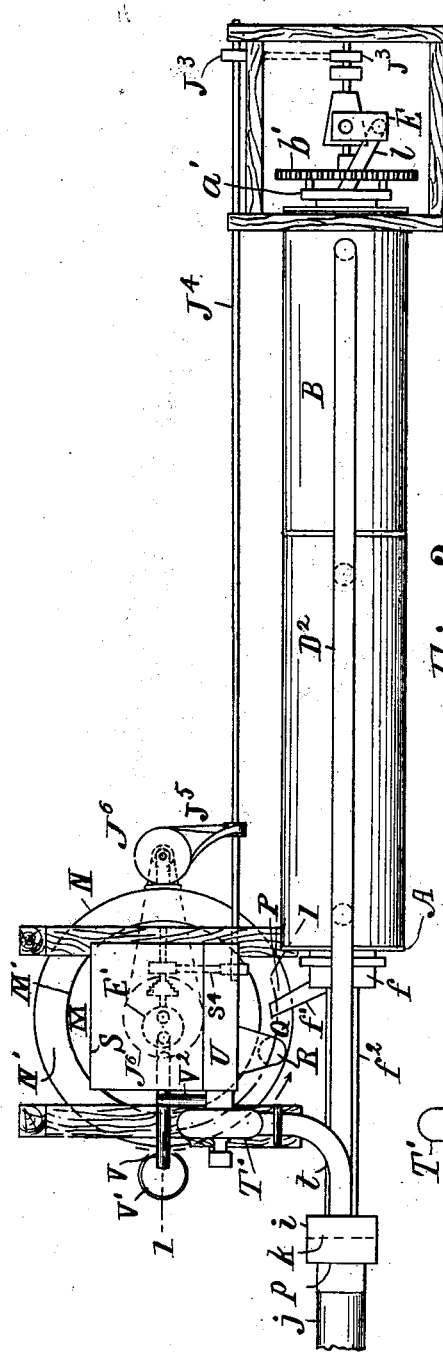

Figure 1 is a side elevation of the apparatus with the left-hand end of the jacket and cylinder in section to exhibit the inner construction and the nearer side of the curb for the cooling-table broken away to exhibit the spouts $f'$ and R within the annular channel and the table and curb shown in section on line 1 1 in Fig. 2. Fig. 2 is a plan of the apparatus. Fig. 3 is an elevation of the apparatus at the inlet end, and Fig. 4 is an elevation of the apparatus at the outlet end. Fig. 5 is a sectional elevation of the discharger and drum. Fig. 6 is a plan of the same device with the cover removed. Fig. $6^a$ is a face view of one of the spiral blades $g$. Fig. 7 is an end view, and Fig. 8 a face view, of one of the stands which suppport the cylinder and jacket. Fig. 9 is a plan of the raw-coffee feeder. Fig. 10 is a central vertical section of the same. Fig. 11 is a vertical section of the same on line 11 11 in Fig. 9. Fig. 12 is a plan of the check-valve. Fig. 13 is a vertical section of the end of the roasting-cylinder with its head and the inlet-spout, and Fig. 14 is a face view of the same. Fig. 15 is a side view, and Fig. 16 an end view, of one of the sectional frames for the non-conducting jacket, the same covering one-half the length of the cylinder.

$a$ designates the roasting-cylinder, and $a'$ designates carrying-rings attached to its ends to rest upon antifriction-rolls $b$.

$c$ designates the inlet-head, fixed to the cylinder, and $b'$ a gear attached to one end and driven by connection with speed-cones J'.

$f$ is a stationary head fitted over the opposite end of the cylinder and provided with downwardly-extending spout $f'$.

$g$ designates spiral blades secured together to make a continuous conveyer and forming a continuous spiral channel from one end of the cylinder to the other, and $g'$ designates ribs between the spiral blades, fixed transversely to the channel against the shell of the cylinder to lift and agitate the coffee as it moves through the channel. The conveyer-blades are made with a central opening $h$, which forms a smoke and steam passage through the center of the cylinder, and the head $f$ is provided with a smoke-nozzle $f^2$, connected to a chaff-box $i$. A flue connection $j$ is extended from the opposite side of the chaff-box to a chimney, and a partition $k$ is extended vertically in the chaff-box between the inlet and outlet for the smoke to arrest the chaff and throw it downward. A door $k'$ is provided at the bottom of the chaff-box to remove the chaff.

B designates the upper sections of the jacket, and B' the lower sections, the same being formed of asbestos or other non-conducting material sustained upon a sheet-metal frame B². (Shown in Figs. 15 and 16.)

The cylinder and casing are mounted upon standards A, which have bearings for the antifriction-rolls $b$, and lugs C and C' to support the upper and lower sections of the casing.

The sections are separated from the cylinder by a space which forms a heating-chamber, and the lower sections B' are separated from one another sufficiently to introduce a gas-pipe G with suitable burners $r$ to heat the chamber and cylinder. The top of the jacket is formed with outlets D', having a flue connection D² to the chaff-box $i$. The division B³ between the sections of the jacket is inclined toward the burners on the gas-pipe to permit inspection and regulation of the flames. The gas would be regulated to produce any desired temperature in the cylinder. In Fig. 1 a counter-shaft I is shown with pulleys I' to rotate the same, and such shaft is connected with a driving-shaft J by a belt applied to tapering speed-cones J', which permit the driving-shaft to be rotated exactly at any desired speed. A shifter J² is shown applied to the belt. The shaft J is connected by belt and pulleys J³ with a shaft J⁴, extended to the delivery end of the cylinder to operate the discharger E', which draws the coffee from a vacuum-receiver in which it is stored after cooling.

The raw-coffee feeder E is shown connected with the hopper F by valve F' and supplying the coffee to the cylinder through feed-pipe $l$. When the coffee has passed through the cylinder, the spout $f'$ discharges the grains to a rotary cooling-table M, from which the grain is drawn upwardly by a pneumatic tube R to a receiver S. From the receiver it passes through a discharger or delivery device (designated E' in Fig. 1) to a discharge-pipe V, by which it is delivered into a bag V' or any other receptacle. A belt J⁵ and pulleys J⁶ connect the shaft J⁴ with the spindle M² of the cooling-table.

The casing E of the feeder is provided, as shown in Figs. 9 and 10, with a drum $m$, pivoted horizontally in the casing tangential to an inclined wall $n$, sloping downward from the inlet, and is formed with two chambers $m'$, extended inward obliquely from its surface and provided each with an adjustable bottom $m^2$. A spring forces the bottom normally outward, and a screw extended through the bottom and the spring serves to hold the bottom at the desired position in the chamber. The inlet is wholly at one side of the drum, and the coffee-beans which enter the inlet, rest upon the inclined wall $n$ and press only in a lateral direction against the drum. The edge of the drum nearest the wall is rotated upwardly, and thus scoops the chamber full of beans, which are then carried over to the opposite side of the drum and fall within the casing. A guard $n'$ is provided between the inlet and the top of the drum to prevent the surface of the drum from carrying any beans over. The beans fall from the chambers into a funnel $m^3$, whose outlet is closed normally by a check-valve $n^2$, the check-valve being shown of a flat metal plate with its edges bent into flanges, through which a pivot-rod $n^3$ is extended. A weight $n^4$ is attached to one end of the flanges, and the pivot is so situated that the weight presses the valve against the mouth of the funnel with a very slight degree of force, so that the charge of coffee-beans from one of the chambers readily opens the valve and throws the beans into the feed-pipe $l$. In Fig. 10 the check-valve is shown open in dotted lines. The drum $m$ is provided with shaft $o$, which is connected with a shaft $o'$ by speed-cones $o^2$, and the shaft $o'$ is connected with the driving-shaft J by belt and pulleys $o^3$. A removable glass panel $m^4$ is illustrated in front of the casing below the check-valve, so that the operator can observe whether or not the feed is operating regularly. The casing is formed with grooves to receive the vertical edges of the glass panel, so that the panel may be slid upwardly if the check-valve becomes deranged and requires any adjustment. The panel is useful chiefly in disclosing the working condition of the drum $m$, which would be the part requiring attention if the feed were irregular.

*Cooling-table for the grains.*—When the coffee has passed through the cylinder, the spout $f'$ leads the roasted grains to a horizontal rotary table M, the edge of which runs close to a curb N, that forms a closed chamber under the table, from which the air is exhausted by the suction of the lifter-pipe which is employed to raise the coffee, as hereinafter described. Annular flanges M' project above the table at a suitable distance to form a channel N' upon the surface of the table, into which the hot coffee is discharged. The table is perforated within this channel, and the exhaust of the chamber beneath draws the atmosphere down through the coffee, and thus cools it in a manner already well known. Fig. 4 shows the table with the channel in section between the curb N and the annular flange M' and the spout $f'$ and lifter-tube R extended downward within the right-hand side of such channel. In Fig. 1 the annular flange M' is exposed by the breaking away of the curb N and appears in the rear of the spout $f'$ and tube R. The spout $f'$ delivers the coffee or other grain to the channel at a point marked P, and at the point Q in the rear of the same (regarding the movement of the table) a pneumatic lifter-pipe R is extended from the channel upwardly into a closed receiver S, which is supported above the table and provided at the bottom with a discharger E' quite different from the feeding device upon the feeding-hopper F. The side of the lifter-pipe R which the coffee approaches is cut away to admit the coffee, while the opposite side is extended quite close to the perforated surface of the table, and the draft of air is thus directed upon the coffee to lift it in the pipe. In Fig. 1 the nearer side of the external curb is broken away, which exposes the outer side of the annular flange M' and the annular channel, which is shown in section in Fig. 4, and the extension of the spout $f'$ and the lifter-pipe R into such annular channel is thus clearly shown in Fig. 1. The receiver has a screened chamber U upon the top with an exhaust-fan T' at the side, and an exhaust is thus produced in the lifter-pipe R, which operates to raise the coffee from the table to the receiver when the coffee reaches the bottom of such pipe. The bottom of the pipe R is cut away upon one side to admit the coffee; but the other side is fitted quite closely to the perforated surface of the table, so that the air to lift the coffee is drawn through the table from the chamber below. Such draft exhausts the chamber sufficiently to produce a downward current through the coffee at all other points except where the pipe operates, and as the table revolves very slowly it is cooled by such downward current in its movement from the spout $f'$ to the pipe R. The spout and pipe are shown in Fig. 2 placed close together, so that the coffee is carried around almost the entire periphery of the channel N' to reach the lifter-pipe. The pipe R enters the side of the receiver S close beneath the screened chamber U, and the exhaust from such chamber thus serves to raise the coffee, while the screen $u$ separates the coffee from the exhausting air and accumulates it within the chamber until discharged.

The outlet $t$ of the exhaust-fan T' discharges to the flue-pipe J through the chaff-box $i$. The cooled grains are then drawn from the receiver through the discharger E', which is constructed with special reference to preventing air from entering the receiver, so that the exhaust-fan T' may operate effectively upon the pneumatic lifter R. The discharger is shown in detail in Figs. 5 and 6 and is more effective for operation with the vacuum-receiver S than a device like the feeding device E, which is designed especially to prevent any of the beans from jamming in their passage through the feeder. The beans are very hard and tough before they are roasted and easily obstruct the feeding device if it is provided with any shearing surfaces, for which reason the drum $m$ of the feeding device is rotated toward the coffee-beans next a sloping surface, so as to lift them from the surface rather than to jam them upon the same. The drum $e$ is rotated from the shaft $J^4$, as shown in Figs. 1, 2, and 4, by a feed-shaft $s$, which is connected with a speed-shaft $s'$ by cone-pulleys $s^2$. The speed-shaft $s'$ is connected with the shaft $J^4$ by belt and pulleys $s^4$, and when the speeds of the raw-coffee feeder and the discharge-drum are suitably regulated they are driven at such regulated speeds by their common connection to the driving-shaft J.

The speed of the shaft J is in practice regulated by adjusting the belt upon the speed-cones J' so as to drive the roasting-cylinder (through the gear $b'$) at the desired speed, and the coffee-feeder and the discharge-drum participate in any change of speed that may be given to the cylinder, so as to feed and withdraw the coffee at precisely the same rate with different speeds of the cylinder.

The discharger, as shown in Figs. 5 and 6, is constructed with a circular casing E', having flat head E² upon the top provided with inlet $n$ and a flat bottom provided with outlet $n'$, the inlet and outlet being at opposite sides of the center, so that the rotary drum $e$, which fits within the casing, may be provided with one or more chambers $e'$ to transfer the coffee from the inlet to the outlet.

The axis of the drum $e$ is vertical, and the inlet $n$ is connected with the receiver S by a pipe S' of sufficient length to retain a mass of the coffee greater than the vacuum may lift. The bottoms of the drum and of the casing are smooth, so that each chamber retains its charge as it is turned to the outlet $n'$, from which the coffee passes into a discharge-pipe V.

I have found that the roasted beans are quite brittle and are liable to be broken by the movement of the drum beneath the inlet unless provision is made for them to clear the moving parts. This I effect by forming an annular recess $e^2$ upon the upper surface of the drum which receives the flow of coffee from the inlet or by correspondingly recessing the head E² of the casing, which causes the corners of the chambers $e^2$ to clear the corners of the inlet $n$. This prevents the cutting or crushing of any of the coffee-grains in the rotation of the drum, and owing to the continuous supply from the hopper F such space is constantly filled with the grains and prevents any material movement of air through the casing. The drum is shown in the drawings with three of the chambers $e'$, but may be made with one or two only, if required. It will be observed that the drum, with the chambers successively filled from the hopper, operates to prevent the free passage of air between the inlet and outlet, and the exhaust of the fan T' thus operates more effectively upon the pneumatic lifter. An exhaust-pipe V² is extended from the exhaust-fan T' to the pipe V, close to the discharger E', and operates to balance the suction upon the inlet of the discharger to permit the coffee to pass freely through the pipe S', and it also has the effect of separating any chaff and light defective coffee-beans from those of normal weight and throwing them into the flue. Such light beans are lifted by the suction from the pipe V, while the good beans pass directly through the same to a receptacle.

Operation of the apparatus: The coffee being supplied to the hopper F and the speed of the roasting-cylinder and of the feeding device E being properly adjusted, as well as the intensity of the burners which heat the chamber D, the coffee is fed continuously from the hopper into the head $c$ of the cylinder. Here it enters the spiral channel between the conveyer-blades and is conducted thereby throughout the length of the cylinder and discharged by the spout $f'$ to the cooling-table M. Here the coffee lies in the channel N exposed to the cooling-draft during almost one rotation of the table. As it reaches the pneumatic lifter-tube R it is raised by the exhaust-fan to the receiver S, from whence it is delivered as required by the discharger V. The suction exerted by the tube R draws air from the interior of the curb N, which forms a downward current through the layer of coffee.

It is obvious that the apparatus may be used for roasting any material of a non-adhesive character, whether coffee, grain, or mineral substances.

The necessity for exact adjustment of the heat and the duration of time in which the material is exposed to the same is much more important, however, in the treatment of coffee than of other materials, and my invention is therefore especially adapted for the roasting of coffee, in which the substance is materially changed in its constitution by the direct application of heat. I have shown and described the roasting-cylinder as of circular cross-section, with the conveyer-blades connected together successively to form a continuous channel; but it is obvious that the same results may be obtained with a cylinder of polygonal cross-section having the conveyer-blades arranged in any suitable manner to propel the coffee continuously from one end of the cylinder to the other and to thus prevent its resting in any one position while in its progress.

The term "continuously" is used herein to define a roasting operation which can be continued indefinitely for any length of time and does not require the periodic insertion of a given charge and the periodic removal of such charge before another charge is introduced.

My feeding and discharging devices, although they deliver only the contents of one of their chambers at a time, are never arrested during the operation of the machine, but the feeder continues to furnish a succession of charges from the drum $m$, so that the roasting-cylinder is continuously supplied, while the discharger continues to draw a succession of charges from the receiver S, so that the main progress of the material through the machine is uniform.

It will be noticed that the coffee is spread in a thin layer in the moving channel of the cooler, and thus cooled with great rapidity as soon as it is discharged from the roasting-cylinder. This arrests any vaporization from the bean and prevents the volatile elements from passing away, which are essential to the highest grade of coffee.

It will be observed in Figs. 15 and 16 that the division $B^3$ between the sections of the jacket is formed as an oblique slit inclined toward the burners, so that they may be inspected at any time by looking through the slit.

One of the conveyer-blades is shown in Fig. $6^a$ with notches $g^2$ in its periphery to support the ribs $g'$, which extend longitudinally of the cylinder, as shown in Figs. 1 and 13, and thus transversely intersect the channel between the conveyer-blades. Such construction furnishes a convenient means of supporting the ribs which agitate the coffee in its passage through the spiral channel, and thus prevent it from lying in contact with the heated iron for a sufficient length of time to receive injury. The roasting-cylinder $a$ is preferably made to divide longitudinally, so that the channels may be inspected in case of any accidental obstruction and the obstruction removed. One means of effecting this is shown in Fig. 8, where the cylinder is shown divided at the sides and lugs $w$ applied to the opposite halves of the cylinder to hold the same in line with one another and a strap $v$ applied around the cylinder and furnished with a bolt $v'$ to hold the same in place while the cylinder is in operation. When an examination of the cylinder is required, the bolts $v'$ are detached, the straps removed, and the two halves of the cylinder can then be separated. The supporting-rings $a'$ are in such case divided upon the same line as the cylinder and the half-rings attached permanently to the opposite halves of the cylinder.

My invention contemplates the progressive movement of the coffee from the time it is placed in the feeding-hopper until it is wholly cooled, and such progressive treatment produces the best results, while it involves certain details of management which may be referred to as showing the importance of mechanism for varying the speeds of all the different parts of the machinery and mechanism for connecting such parts together to operate in unison when regulated. Thus when the machine is first started the roasting-cylinder requires heating before the coffee is introduced thereto, and the coffee which first circulates through the machine necessarily operates to reduce the temperature of the conducting-surfaces of the cylinder upon which the coffee rests, and such first portion of the coffee I have found is insufficiently roasted unless the cylinder be previously heated to a temperature a little above that required in the treatment of subsequent portions.

As a variation of a few degrees impairs the quality of the coffee I insert the stem $z$ of a pyrometer through the collar $c'$ within the roasting-cylinder, and the index $z'$ of the pyrometer is exposed, as shown in Fig. 1, above the cone-pulleys J'. The inspection of the index $z'$ enables the operator to regulate the heat by the cock G' and to actuate the belt-shifter $J^2$ to control the speed of the coffee through the cylinder in proportion to its temperature.

Considerable steam is generated by the drying of the roasted coffee, and I have found it desirable to remove such steam promptly from the apparatus, which is effected through the smoke-nozzle.

The speed-cones J' operate by an exact adjustment of their connecting-belt to vary the speed of the roasting-cylinder in the most exact manner, which cannot be effected by a series of cone-pulleys nor by any change of gearing, and I take advantage of this fact to slightly increase or diminish the movement of the coffee through the cylinder when the temperature inadvertently rises or falls below the normal point. Assuming that the counter-shaft I is rotated uniformly, the proper position of the belt upon the speed-cones, corresponding with the proper speed of the cylinder for any given temperature, can be ascertained by experiment and a scale applied to the shifter $J^2$ to set the belt in a position which corresponds with the temperature indicated by the pyrometer. Such a scale $x$ is marked upon the guide which supports the shifter, and a finger $x'$ is extended from the shifter to such scale which would in practice be marked with numbers corresponding to the degrees of temperature which required such adjustment of the belt. By the use of the shifter-rod and the pyrometer absolute uniformity in the product can be secured, which is practically impossible with devices regulated in a less perfect manner.

The present application is a renewal, with additional new matter, of my application No. 40,350, filed December 19, 1900, and allowed March 8, 1901.

Having thus set forth the nature of the invention, what I claim herein is—

1. In a coffee-roaster, a roasting-cylinder, means for heating the same, means for feeding the coffee to the cylinder, a cooling-table having a progressively-moving surface, means for discharging the roasted coffee from the cylinder to the table, means for regulating the heat, and means connected with the cylinder, the feeding device and the movable surface of the cooling-table to move them all in unison at a regulated speed.

2. In a coffee-roaster, a roasting-cylinder, means for heating the same, means for feeding the coffee to the cylinder, means, as the flue connection $f^2$, for drawing the steam from the cylinder, a perforated cooling-table having a progressively-moving surface, means for discharging the roasted coffee from the cylinder to the surface of the cooling-table, mechanism for removing the coffee from the cooling-table, means for regulating the heat of the cylinder, and means connected with the feeding device, the roasting-cylinder, the surface of the cooling-table and the mechanism for removing the coffee from the cooler to move them all in unison at a regulated speed.

3. In a coffee-roaster, a roasting-cylinder, means for heating the same, a coffee-feeder to supply the cylinder, a perforated cooling-table having a progressively-moving surface, means for discharging the roasted coffee from the cylinder to the table, means for regulating the speed of the cylinder, means connected with the cooling-table to move its surface in unison with the cylinder, and means connected with the cylinder for varying the speed of the feeding device.

4. In a coffee-roaster, the combination, with the roasting-cylinder $a$ having supporting-rings $a'$ at its opposite ends and antifriction-rolls $b$ to carry the same, of the driving-shaft $J$ and counter-shaft I connected by the tapering speed-cones $J'$ and a driving-belt applied to the same, the annular gear $b'$ upon the roasting-cylinder connected with the driving-shaft $J$, the coffee-feeder connected with the cylinder by pipe $l$ and having its shaft $o$ connected with shaft $o'$ by belt and speed-cones $o^2$, and the shaft $o'$ connected with the shaft $J$, the whole arranged and operated substantially as set forth to vary the speeds of the roasting-cylinder and the feeding device independently.

5. An automatic coffee-roaster comprising a roasting-cylinder with a smoke pipe or flue connection for withdrawing the vapors, means for heating the cylinder, means for continuously feeding the coffee into the cylinder, a movable cooling-table, means for discharging the roasted coffee continuously from the cylinder upon the moving table in a thin layer, means for removing the cooled coffee from the table, and means for regulating the heat of the cylinder, and for varying the speed of the cylinder, the feeding device and the cooling-table.

6. An automatic coffee-roaster comprising a roasting-cylinder with a smoke pipe or flue connection for withdrawing the vapors, means for heating the cylinder, means for continuously feeding the coffee into the cylinder, a movable cooling-table, means for discharging the roasted coffee continuously from the cylinder upon the moving table in a thin layer, a pneumatic lifter applied to the table to remove the coffee when cooled, and means for regulating the heat of the cylinder, and for varying the speed of the cylinder, the feeding device and the cooling-table.

7. An automatic coffee-roaster comprising a roasting-cylinder with a smoke pipe or flue connection for withdrawing the vapors, means for heating the cylinder, means for continuously feeding the coffee into the cylinder, a movable cooling-table, means for discharging the roasted coffee continuously from the cylinder upon the moving table in a thin layer, an exhaust-receiver to store the coffee, a pneumatic lifter to lift the coffee from the table to the receiver, a discharger connected with the receiver and adapted to discharge the coffee from the receiver and prevent the access of air thereto, and means for regulating the heat of the cylinder and for varying the speed of the cylinder, the feeding device, and the cooling-table.

8. An automatic coffee-roaster comprising a roasting-cylinder with a smoke pipe or flue connection for withdrawing the vapors, means for heating the cylinder, means for continuously feeding the coffee into the cylinder, a movable cooling-table, means for discharging the roasted coffee continuously from the cylinder upon the moving table in a thin layer, an exhaust-receiver to store the coffee, a pneumatic lifter to lift the coffee from the table to the receiver, means for discharging the coffee from the receiver to a discharge-pipe V, and an exhaust connection from the upper part of such discharge-pipe to remove the light beans and chaff therefrom.

9. An automatic coffee-roaster comprising a roasting-cylinder with a smoke pipe or flue connection for withdrawing the vapors, means for heating the cylinder, means for continuously feeding the coffee into the cylinder, a movable cooling-table, means for discharging the roasted coffee continuously from the cylinder upon the moving table in a thin layer, an exhaust-receiver to store the coffee, a pneumatic lifter to lift the coffee from the table to the receiver, a discharger to draw the coffee from the receiver, and a feed-pipe extended downward from the receiver to the discharger to remove the coffee from the influence of the vacuum.

10. In a coffee-roaster, the combination, with the roasting-cylinder and spiral blades for propelling the coffee through the same, of a hopper connected with the receiver by feed-pipe $l$, and the coffee-feeder interposed in such pipe and having the casing E with inlet at the top, the wall $n$ inclined below the inlet as set forth, and the drum $m$ pivoted horizontally adjacent to such wall and provided with one or more chambers $m'$.

11. In a coffee-roaster, the combination, with the roasting-cylinder and spiral blades for propelling the coffee through the same, of a hopper connected with the receiver by feed-pipe $l$, and the coffee-feeder interposed in such pipe and having the casing E with inlet at the top, and funnel $m^2$ at the bottom, with the wall $n$ inclined below the inlet, the drum $m$ pivoted horizontally adjacent to such wall and provided with one or more chambers $m'$ as set forth, and a check-valve fitted to the outlet of the funnel to exclude the cylinder-vapors from the drum.

12. In a coffee-roaster, a feeding device for the roasting-cylinder, comprising the casing E with inlet at the top, and funnel $m^3$ at the bottom, with a wall extended downward from the inlet, the drum $m$ pivoted horizontally adjacent to such wall and provided with one or more chambers $m'$ as set forth, a removable cover upon the casing over the drum, the check-valve fitted to the outlet of the funnel, and the chamber below such outlet having glass panel upon the front and pipe connection at the bottom, the whole arranged and operated substantially as herein set forth.

13. In a coffee-roaster, the combination, with the roasting-cylinder and spiral blades for propelling the coffee through the same, of a hopper connected with the receiver by feed-pipe $l$, and the coffee-feeder interposed in such pipe and having the casing E with inlet at the top, a wall extended downward from the inlet, and the drum $m$ pivoted horizontally adjacent to such wall and having one or more chambers $m'$, and a bottom $m^2$ movable in each chamber, and a screw and spring to adjust the same, as and for the purpose set forth.

14. In a coffee-roaster, the combination, with standards A having bearings provided with antifriction-rolls $b$ and lugs C and C' to support a jacket, of a roasting-cylinder $a$ supported upon such antifriction-rolls, means for continuously feeding the coffee to and discharging it from the cylinder, a non-conducting jacket forming a chamber about the cylinder and made in detachable sections B and B' supported upon the lugs C and C', and the chamber being provided with smoke-outlets and a flue connection, as and for the purpose set forth.

15. A coffee-roaster having a roasting-cylinder divided longitudinally and provided with carrying-rings and antifriction-rolls to support the same, means for continuously feeding the coffee to and discharging it from the cylinder, standards supporting the antifriction-rolls, with a jacket in sections supported upon the standards, whereby the sections of the jacket may be removed and the cylinder divided to inspect its interior, as and for the purpose set forth.

16. In a coffee-roaster, the combination, with the roasting-cylinder and means for propelling the coffee through the same, of the discharger for removing the cooled coffee continuously and preventing the free passage of air with the coffee, said device having a circular casing E' with opposite heads $E^2$ and $E^3$ having, respectively, the inlet $n$ and outlet $n'$, and the rotary drum $e$ with one or more chambers $e^t$ adapted to carry the coffee from the inlet to the outlet, and the top of the drum being separated, as by channel $e^2$, from the head E' of the casing by sufficient space to admit a layer of coffee-berries, to avoid obstruction from the berries in the rotation of the drum.

17. In a coffee-roaster, the combination, with the roasting-cylinder, means for continuously feeding the coffee into the cylinder and discharging it continuously from the same, of a rotary cooling-table M with perforations around its margin, means, as the walls or flanges M', to form the channel N' upon such perforated surface, means for drawing air downwardly through the perforations to cool the coffee, and means for removing the coffee from the channel in its rotations, as and for the purpose set forth.

18. In a coffee-roaster, the combination, with the roasting-cylinder, means for continuously feeding the coffee into the cylinder and discharging it continuously from the same, of the curb N, the rotary cooling-table with perforations around its margin, walls forming an annular channel along such perforations, and a pneumatic lifter applied to the channel to remove the coffee at a given point in its circuit, and operating to draw air through the perforations into the curb to cool the coffee.

19. In a coffee-roaster, the combination, with the roasting-cylinder, means for continuously feeding the coffee into the cylinder and discharging it continuously from the same, of a rotary cooling-table with annular channel upon its margin, a receiver supported above the level of the table with closed top having a screened chamber and exhaust-fan connected thereto, a pneumatic lifter-tube connected with the receiver and extended to the channel to remove the coffee, and means for discharging the coffee from the receiver and cutting off the inlet of air to the receiver during such discharge.

20. In a coffee-roaster, the combination, with the roasting-cylinder, of a hopper for supplying coffee thereto, a feeding device for delivering coffee from the hopper to the cylinder, and cutting off the inlet of air to the hopper during such delivery, means for continuously discharging the coffee from the roasting-cylinder, a movable cooling-table receiving the coffee from such cylinder, a receiver with closed top supported above the level of the table, and means for exhausting the air from the same, a pneumatic lifting-tube connected with the upper part of the receiver and extended to the cooling-table to remove the coffee, and means for discharging the coffee from the receiver and cutting off the inlet of air to the receiver during such discharge.

21. In a coffee-roaster, the combination, with the roasting-cylinder and continuous feeding device, of spiral conveyer-blades secured inside its shell with central opening in such blades to form a smoke-passage, a stationary head for the cylinder with outlet at the bottom for continuous discharge, a nozzle upon such head connected with a chaff-box, a vertical partition in the chaff-box directing the smoke to the end of the box, and a flue connection from the box upon the side opposite to the partition, whereby the chaff is separated from the smoke, substantially as herein set forth.

22. In a coffee-roaster, the combination, with the roasting-cylinder and continuous feeding devices, of spiral conveyer-blades secured inside the shell of the cylinder and provided in their convolutions with alined notches $g^2$, continuous ribs $g'$ extended through a series of the alined notches in contact with the interior of the cylinder, a stationary head for the cylinder fitted to the exterior of the same and having outlet at the bottom for continuous discharge, and means for exhausting the smoke and steam from the cylinder, substantially as herein set forth.

23. In a coffee-roaster, the combination, with a roasting-cylinder, means for rotating the same, and means for feeding the coffee continuously to and discharging it from the cylinder, of a non-conducting jacket forming a chamber about the cylinder and made in detachable sections, the chamber having gas-pipe G supported in its lower part and provided with burners, and the sections being shaped to form the lateral division $B^3$ inclined toward the burners to permit inspection of the flames.

In testimony whereof I have hereunto set my hand in the presence of two subscribing witnesses.

TIMOTHY M. WARD.

Witnesses:
F. B. HARDY,
THOMAS S. CRANE.